Aug. 14, 1923. 1,464,816
J. F. GRACE
DISTRIBUTOR FOR COOLING TOWERS AND THE LIKE
Filed March 20, 1920
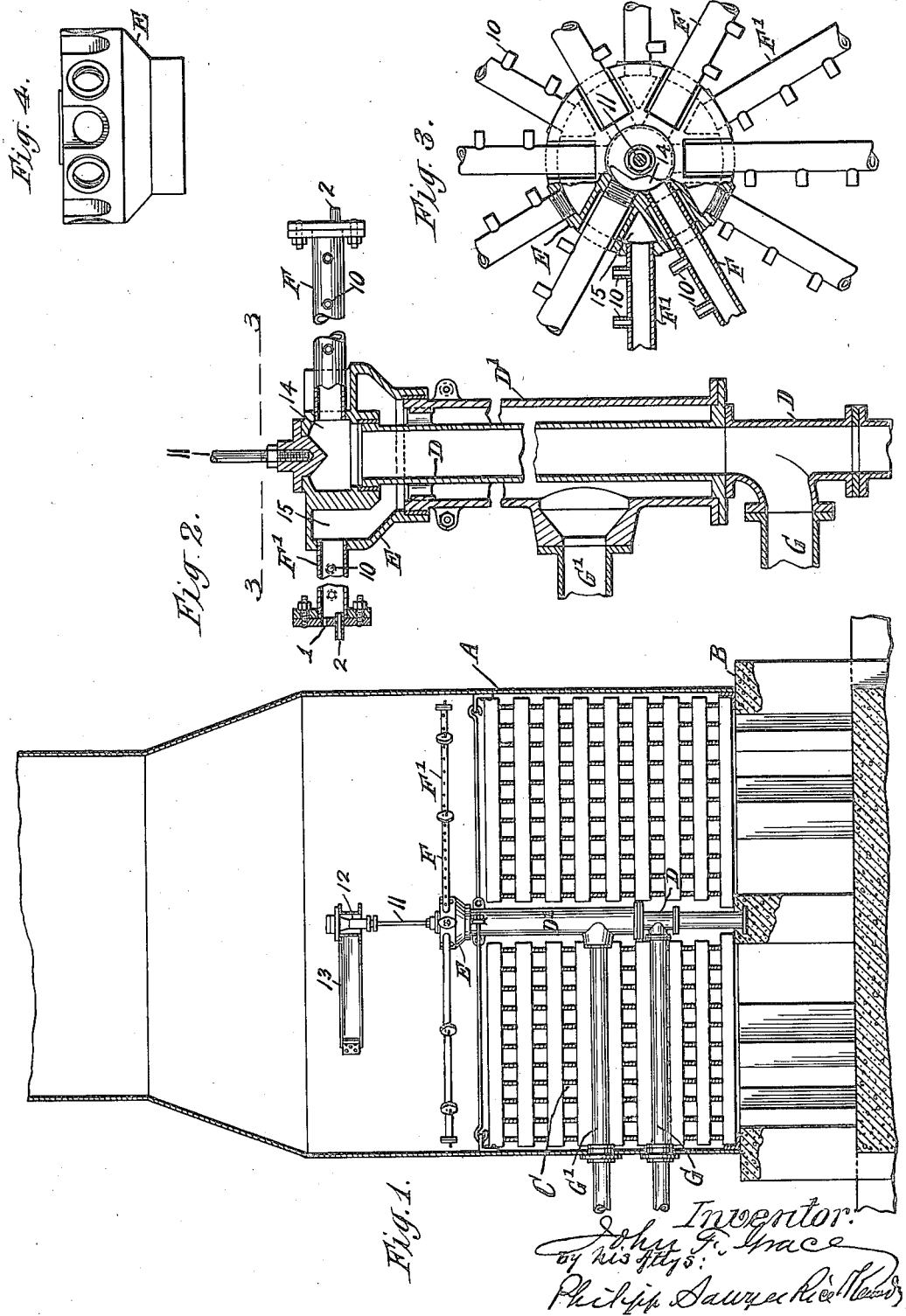

Patented Aug. 14, 1923.

1,464,816

UNITED STATES PATENT OFFICE.

JOHN F. GRACE, OF KEARNEY, NEW JERSEY, ASSIGNOR TO WORTHINGTON PUMP AND MACHINERY CORPORATION, A CORPORATION OF VIRGINIA.

DISTRIBUTOR FOR COOLING TOWERS AND THE LIKE.

Application filed March 20, 1920. Serial No. 367,447.

*To all whom it may concern:*

Be it known that I, JOHN F. GRACE, a citizen of the United States, residing at Kearney, county of Hudson, and State of New Jersey, have invented certain new and useful Improvements in Distributors for Cooling Towers and the like, fully described and represented in the following specification and the accompanying drawings, forming a part of the same.

This invention relates to rotating distributors of that class used for distributing water or other liquid, the especial object of the invention being to provide a simple, compact and efficient construction, by which the proper speed of rotation and liquid distribution is secured, with the distributor operating on liquid received from two or more sources.

The invention has been designed in connection with and is especially applicable to the cooling towers now used in connection with large steam plants for cooling the circulating or other water from a plurality of condensing units. In such service, difficulty has been found in securing proper operation with these distributors of the Barker's mill type when one or more of the condensing units is thrown out of operation, thus varying the amount of water flowing to the distributor, because the water flowing from the spouts does not then produce a sufficient speed of rotation of the distributor, so that the proper distribution of the liquid and high cooler efficiency is not secured.

I avoid this difficulty in accordance with the present invention by providing two independent water circulations, each having its own distributing arms or pipes, but all sets of arms or pipes being carried by a single rotating head, and am thus enabled to secure the same speed of water flowing from the spouts, whether one or more units are in operation, and thus maintain substantially the same rotating speed of the distributor under all conditions. The different liquid circulations preferably connect with alternate arms or pipes of the distributor, thus maintaining a proper distribution of the liquid over the tower.

In the accompanying drawings forming a part of this specification I have shown for the purpose of illustration a cooling tower embodying the invention in the preferred form now known to me, and this construction will now be described and the features forming the invention then specifically pointed out in the claims.

In the drawings—

Figure 1 is a vertical section of a cooling tower with the distributor and connecting and water circulation pipes in elevation;

Figure 2 is a vertical central section through the distributor;

Figure 3 is a plan view, partly broken away, on the line 3—3 of Fig. 2, and

Figure 4 is a side elevation of the distributor head.

Referring to the drawings, the cooling tower is shown as of a common form adapted for natural draft, but may be of any suitable type, as, for instance, a cooling tower such as shown in my prior Patent No. 1142809, June 15, 1915. A is the circular shell on foundation B, open for natural draft; C the filling of any suitable form, and D, D' the central fixed water circulation pipes on which is mounted the rotating distributing head E having the usual radial distributing arms with spouts 10, these arms being arranged in two alternating series F, F' in the construction shown. The ends of the arms F, F' are shown as having the usual air outlet 1 and small water outlet 2. The distributing head, mounted and suitably packed on pipe D' to rotate without leakage, may be supported in any suitable manner, but is shown as hung by rod 11 from a ball or other suitable bearing in support 12 carried by I-beams 13 mounted in the tower shell.

The distributing head E has two water chambers and water circulating connections, viz, inner chamber 14 connecting with arms F and mounted with suitable packing on inner pipe D through which it connects with pipe G to one condensing unit, and an outer chamber 15 communicating with arms F' and through pipe D', on which the head is mounted in the same manner as on pipe D, with pipe G' from the second condensing unit. This provides two independent water circulations, one through the inner pipe D and arms F, and the other through the outer pipe D' and alternate arms F', whereby the proper speed and distributing action is secured whether water is received from one or both condensing units.

It will be understood that the invention is not limited to a Barker's mill type of distributor nor the construction and arrangement of parts illustrated, but that many modifications may be made therein by those skilled in the art while retaining the invention defined by the claims, and that the invention is not confined to cooling towers, but is applicable generally where liquid from a plurality of sources is to be distributed and it is desired to rotate the distributor at substantially the same speed whether one or more supplies are in operation.

What I claim is:

1. A rotating liquid distributor of that type rotated by the flow of water being distributed, having separate distributing members and separate connections for the flow of liquid to said members from different liquid supplies, any one of which is capable of rotating the distributor.

2. A rotating liquid distributor of that type rotated by the flow of water being distributed, having its distributing arms arranged in sets and the different sets provided with separate connections to different liquid supplies, any one of which is capable of rotating the distributor.

3. A rotating liquid distributor of that type rotated by the flow of water being distributed, having its distributing arms arranged in sets and the different sets provided with separate connections to different liquid supplies, any one of which is capable of rotating the distributor, the arms of the different sets alternating.

4. The combination with the rotating distributing head E having inner and outer chambers 14, 15 provided with distributing arms F, F', of inner and outer pipes D, D' forming separate water connections for the two chambers with different sources of liquid supply.

In testimony whereof, I have hereunto set my hand.

JOHN F. GRACE.